United States Patent Office 3,578,476
Patented May 11, 1971

3,578,476
DYESTUFFS FOR ORNAMENTAL COATINGS OR THE LIKE
Robert J. Perkel, R.D. 3, Lamington Road, Branchburg Township, Somerset County, N.J. 07826
No Drawing. Filed Apr. 3, 1969, Ser. No. 813,282
Int. Cl. C08h 17/02
U.S. Cl. 106—193                                    10 Claims

ABSTRACT OF THE DISCLOSURE

The specification describes a dyestuff useful for ornamental coatings. The dyestuff is produced by reacting an organic titanate with a phenolic substance, conveniently a phenolic resin. The product is soluble in most organic finishes and produces a metallic gold finish on neutral-colored metal surfaces.

---

This invention relates to a stable organic dyestuff especially useful for imparting color to ornamental coatings.

Varnishes and lacquers are customarily colored by the addition of a variety of dyes and pigments. The coloring agents produce an infinite range of colors and quite commonly are selected so that the coating resembles natural wood or metal. A metal or metalized appearance is simulated most often by applying, to a reflecting surface, a thermosetting or thermoplastic resin containing a coloring agent selected from complex, and generally expensive, organic dyestuffs. In baking resins the colorant must be thermally stable to survive the curing period. In all coatings the colorant must be light stable to endure in the use environment.

This invention is directed to dyestuffs meeting the above desiderata but which in addition are unusually simple chemically and are considerably less expensive to produce than prior art colorants used for this purpose. They are primarily useful for producing decorative coatings resembling gold, and metals related to gold in color appearance such as copper, and copper alloys (e.g. brass and bronze). The colorant is defined as the reaction product of an organic titanate, as herein defined, with a phenolic-containing material. The product is a solution (or in some cases a precipitate) having a deep yellow or gold color. This, when added to a thermosetting or thermoplastic resin composition and applied as an ornamental coating to a reflective surface, gives a striking metallic gold lustre. The color has been tested for stability and is found to be thermally stable and fade-resistant. Specifically, it survives baking at 300° Farenheit for several hours and can be exposed for more than 2000 hours in an Atlas Fade-Ometer with no evidence of fading. The reaction product which constitutes the dyestuff has not been identified and for this reason extensive tests have been made to determine the reactants useful for producing the dyestuff.

The organic titanates useful in the reaction are categorized as ortho esters and acylates. Since titanium has a valence of four and a maximum coordination number of six, the ortho esters may be subdivided into two group—those derived from simple monohydric alcohols having, in addition to the hydroxy group, other functional groups, such as carboxyl groups, amino groups or additional hydroxy groups. These additional functional group may serve as electron donors to the titanium atom thus forming secondary valence bonds or chelates. A survey of organic titanates representing these three groups, i.e., tetraalkyl titanates, titanium chelates and titanium acylates was undertaken to demonstrate, within reasonably predictable limits, that organic titanate compounds in general function adequately for the purpose of the invention. The following examples are presented to illustrate the invention. In each case proportions given are by weight.

EXAMPLE 1

An ortho ester, of the tetraalkyl titanate group, specifically, tetraisopropyl titanate, is mixed with a conventional pure phenolic resin to give a mixture of ten parts resin to one part titanate. Both constituents are conveniently dissolved in a solvent (e.g. 50% resin in ethanol, 25% titanate in methanol). The solvent is present in each example described herein but is incidental to the invention. Tetraisopropyl titanate has a viscosity of approximately five cps. at 25 degrees centigrade and is instantly soluble in the phenolic resin. The phenolic resin is prepared by condensing 100 parts (by volume) of tertiary butyl phenol with 18.1 parts of paraformaldehyde and two parts oxalic acid. Condensation may be achieved by heating at reflux for fifteen to twenty minutes and dehydrating at atmospheric pressure to 300° Farenheit. This is a standard technique for producing a well-known category of resins. Reaction between the titanate and the resin is immediate with the appearance of a deep amber color. The resulting product is a dyestuff which, when added to a standard resin varnish or lacquer and applied in the usual manner, forms a stable gold coating. From the standpoint of compatability, color, stability, handling, etc. this solution is exceptional and, of those tested, is especially recommended.

EXAMPLE 2

The general procedure outlined in Example 1 is followed except that the titanate is n-tetrabutyl titanate. This titanate also has relatively low viscosity, 67 cps. at 25° centigrade. It is very soluble and forms a strong color.

EXAMPLE 3

In this example the tetrabutyl isomers are substituted for n-tetrabutyl titanate in Example 2. Isobutyl, secondary butyl, and tertiary butyl titanates all give satisfactory results. These titanates have good mixing characteristics due to their high solubility and very low viscosity (<5 cps. at 25 degrees centigrade).

EXAMPLE 4

In this example a polymerized tetraalkyl titanate is used in the manner described in Example 1. The titanate is polymerized tetraisobutyl titanate containing 16.8 percent Ti and characterized by the following properties: viscosity approximately 3200 (at 25° centigrade), spec. gr.—1.131, and B.P. of hydrolysis by-product—117° centigrade. Except for the high viscosity, which makes mixing inconvenient, this titanate is completely satisfactory.

In view of the expected efficacy of the polymerized titanate the reference to tetraalkyl titanates used herein and in the appended claims is intended to include modified compounds such as simple polymers where use is made of the teachings of this invention.

EXAMPLE 5

A branched alkyl titanate, tetrakis (2-ethylhexyl) titanate is used in place of the tetraisopropyl titanate of Example 1. This titanate has a molecular weight of 565 but is still a liquid (having a viscosity of 140 at 25° centigrade). The reaction product exhibits a useful color although it is somewhat weaker than that obtained with simpler alkyl titanate reaction products.

EXAMPLE 6

A high molecular weight alkyl titanate, specifically, tetrastearyl titanate, is used in this example. This compound has a molecular weight of 1126 and is a pale yellow solid. The latter property makes mixing less convenient than with liquid reactants but the reaction product is useful for the purpose of this invention.

EXAMPLE 7

This example describes the use of a mixed tetraalkyl titanate. Tetraisopropyl titanate is mixed with various proportions of tetrastearyl titanate and reacted with the phenolic resin as in Example 1. The resulting reaction product gave results similar to those obtained in Example 1. The highly satisfactory results obtainable with this mixture of a low molecular weight, short-chain alkyl titanate, and a long-chain, high molecular weight alkyl titanate suggests that any mixture of tetraalkyl titanates is likely to produce useful results. Therefore, the use of a mixture of any of the compounds described herein is a likely equivalent to the use of any constituent alone.

EXAMPLE 8

In this example the usefulness of a chelated titanate is demonstrated. The chelate is titanium acetyl acetonate which can be produced by chelating a simple tetraalkyl titanate, tetraisopropyl titanate, with 2.4 pentanedione using a 1:2 mol ratio. The chelate is a clear red liquid having a low viscosity (12 cps. at 25° centigrade) and is highly soluble in the phenolic resin. The reaction product evidences strong coloration and resembles that of Example 1 in its dyestuff properties.

EXAMPLE 9

In this example triethanolamine titanate, another titanate chelate, is reacted with the phenol resin as in Example 1. The reaction product has a deep color which, when used in a coating resin, produces a coating resembling brass. The deep color may be due to auxochromic behavior of the amino groups.

EXAMPLE 10

In this example the titanate used is tetraoctylene glycol titanate, another titanium chelate. This solution was prepared in the same way as those of the previous examples but yielded weak, although useful, color.

EXAMPLE 11

The titanate used in this example is again a chelate, the ammonium salt of titanium lactate. Preparation is the same as in Example 1. The colorant produced in this case was also weak.

EXAMPLE 12

In this example the titanate is a titanium acylate, polyhydroxy stearate. This compound is a light brown solid having 13.4 percent Ti, a spec. gr. of 1.126, a thickening point of 45° centigrade, and a hydrolysis by-product that decomposes. The reaction product is a useful dyestuff.

The foregoing examples have been included to establish that the constituent responsible for the formation of the dyestuff is the titanate structure $Ti(OR)_4$. From the examples given above it is seen that the nature of the radical R does not appear to be important to the result sought. The $Ti(-O-)_4$ structure is responsible for the formation of the dyestuff. Thus it is found that the R of this, or the acylate structure ($-COR$), may be independently selected from alkyl, aryl, and cycloalkyl or from the category of titanium chelates which contain the $Ti(-O-)_4$ structure. Within this group, the simple alkyl titanates having the general formula $Ti(OR)_4$, where R is an alkyl group having less than seven carbon atoms, is preferred from the standpoint of economy and the results obtained.

It is significant to point out that the dyestuff of the foregoing examples can be produced at a fraction of the cost of conventionally used dyestuffs.

The phenolic material reacted with the organic titanate may be selected from a wide variety of phenolic materials, and in particular, phenolic resins known to be useful for decorative or protective coatings. The following examples illustrate the effectiveness of several phenolic substances for producing desirable coloranats in admixture with the organic titanates described above. In each case the mixture contained 50 parts methanol (as a diluent carrier), 10 parts of an organic titanate, in this case tetraisopropyl titanate, and 32 parts of the phenolic compound (excluded from control). The several phenolic compounds produce the colors indicated.

| Ex. | Phenolic compound | Color |
|---|---|---|
| 13 | Control (pure phenolic resin) | Pale yellow. |
| 14 | Phenol | Yellow (darker than control). |
| 15 | Hydroquinone | Gold yellow. |
| 16 | Pyrogallol | Red gold. |
| 17 | Nonyl phenol | Yellow gold. |
| 18 | Beta napththol | Gold yellow. |
| 19 | Bis-phenol A | Do. |

In the case of phenolic resin coatings it has been found that to promote the desired end product the resin must contain at least ten percent of a pure phenolic resin, i.e., a condensation product of formaldehyde or para-formaldehyde with phenol. Phenol in this case is generic to that limited class of hydric phenols including monohydric phenol, 1,2-, 1,3-, and 1,4-dihydric phenol and 1,2,3-, 1,2,4- or 1,3,5-trihydric phenol. Substituted phenols such as cresol are also within this genus. Of this genus the following specific phenols are considered to be preferred species from the standpoint of effectiveness and economy: phenol, o-cresol, m-cresol, p-cresol, isomeric xylenols, para-phenyl phenol, para-hydroxy biphenyl, para-chlorophenol, dichlorophenol, d-naphthol, b-naphthol, resorcinol, hydroquinone, cashew nut liquid, Bisphenol A, p.t. butyl phenol, octyl phenol, nonyl phenol, decyl phenol. The phenolic constituent can be modified as for example by more complex phenolic resins or by alkyd or natural resins but with a loss in color intensity. Such modifications may be found useful for special-purpose coatings.

A typical phenolic resin derived from phenol can be prepared as follows:

The following ingredients are mixed in the proportions (by volume) indicated:

| | |
|---|---|
| Phenol | 564 |
| 50 percent NaOH | 11.2 |
| Water | 145 |
| p-Formaldehyde | 231 |

The mixture is heated to 140° Fahrenheit. The heat of reaction raises the temperature to 200° Fahrenheit. Heating is continued for two hours to complete the condensation. The product is dissolved in 330 parts isopropyl alcohol, a convenient carrier.

This phenolic resin can be used for preparing any of the coating compositions described herein with little or no alteration in preparation or results. The phenolic resin used in Example 1 was derived from a substituted phenol, tertiary butyl phenol. Other substituted phenols may be used as well.

The following examples are given to further define the category of resins to be reacted with the organic titanate constituent defined above.

EXAMPLE 20

The procedure of Example 1 is followed except that the pure phenolic resin is a condensation product at reflux of 18 parts (by volume) para- or formaldehyde with 100 parts para phenyl phenol. The results are indistinguishable from those of Example 1.

EXAMPLE 21

The same results as were obtained in Example 13 are found when the resin is the condensation product (at reflux) of 18 parts para- or formaldehyde with 150 parts nonyl phenol.

EXAMPLE 22

A modified phenolic alkyd resin commonly referred to as a baking resin was substituted for the pure phenolic resin of Example 1. The modified resin contained 25 weight percent of a pure phenolic resin and 75 percent of caster oil alkyd resin. The color of the product becomes less intense as the proportion of the active reactant (phenolic constituent) is reduced. However, useful results can be obtained as long as the phenolic resin comprises a minimum of approximately 10 weight percent of the total. Other modifiers such as fillers, stabilizers, other dyestuffs to modify the colors can be added without affecting the basic usefulness of the dyestuff of this invention.

The ratio of organic titanate to phenolic resin useful for obtaining the desired dyestuff varies over wide limits depending upon the concentration of colorant desired. As indicated, in Example 1, the product can reach a deep amber color which can then be used as a color concentrate. It would be expected that the titanate would be added in amounts of at least one percent by weight to form a useful concentrate. There is theoretically no maximum. Additions of the order of 30–90 weight percent produce yellow-orange precipitates which can be used as pigments. For use as a color concentrate, or colorant, a range of one percent to thirty percent of titanate is recommended. The effect of the titanate concentration on color development is given in the following table.

TABLE I

| Ratio of phenolic resin to titanate (weight): | Color |
| --- | --- |
| 1000 | Pale yellow-darker than control (titanate). |
| 100 | Definite yellow color. |
| 10 | Deep yellow solution. |
| 3.25 | Deep yellow solution and resinous orange precipitate. |
| 1 | Yellow-orange precipitate. |
| .01 | Slight orange precipitate. |

These data were obtained using the solution of Example 1. The color development for a given titanate concentration will vary depending on the titanate compound used but the ranges given are considered to be generally useful.

The color concentrate can be added to a wide variety of coating compositions and applied to virtually any article by methods which are well established in the art. The colorant is particularly useful when added to organic finishes. Among these, good results have been obtained with bake finishes of the urea alkyd and melamine alkyd type, phenolic varnish, nitrocellulose plasticizer and nitrocellulose alkyd. The amount of concentrate to be added depends upon the intensity of color desired. The ultimate coating composition would normally include at least 2 weight percent to 20 weight percent of the dyestuff to make use of the teachings of this invention.

The results, in terms of light fastness of the addition of the dyestuffs of this invention to various well-known types of organic finishes are given in the following table. The dyestuff is that of Example 1 mixed in proportions of one part colorant to ten parts of coating composition.

TABLE II

| Coating type | 2,000 hours exposure in Atlas Fade-Ometer | Sun exposure, 4½ months |
| --- | --- | --- |
| Urea alkyd bake | No change | No change. |
| Melamine alkyd bake | do | Do. |
| Phenolic varnish | do | Do. |
| Nitrocellulose plasticizer | do | Do. |
| Nitrocellulose alkyd | do | Do. |

It has additionally been discovered that the color developed by the reactions described above can be significantly enhanced by the addition of hydrogen ions. Specifically, it is found that the addition of organic or inorganic acids to the soluble dyestuffs intensifies the color and changes it slightly toward a redder shade. Although these additions are not necessary to produce a desirable result, they present a convenient and inexpensive means for enhancing the color of the dyestuff. To demonstrate the effect of acid additions to the dyestuff the following acids were added to the composition produced in Example 1. In each case the acid addition deepened the color of the solution.

| | |
| --- | --- |
| N butyl phosphoric | 3% by weight. |
| Methyl acid phosphate | do. |
| p-Toluene sulfonic | do. |
| Citric | do. |
| Acetic | 3% glacial by weight. |
| Formic | do. |
| p-Toluene sulfonic | 0.3% glacial by weight. |

The weight basis includes titanate and phenol (excluding solvent).

Concentration studies have indicated that acid additions as low at 0.3% by weight of titanate-phenol are effective for the purpose indicated. Increasing the amount of acid added does not result in further color deepening. The conclusion is that the acid addition is effective over a given threshold. As near as was determined, this threshold lies at about 0.1% of acid.

Various modifications and deviations of the invention described above will occur to those skilled in the art. All such variations and alternatives that basically rely on the teachings through which this invention has advanced the art are properly considered within the scope of this invention.

What is claimed is:

1. An ornamental coating material comprising an organic finish containing 2 to 20 weight percent of a color concentrate, the color concentrate consisting essentially of the reaction product of an organic titanate, which includes the structure Ti(—O—)$_4$, with a phenolic resin.

2. The coating material of claim 1 wherein the organic titanate is further defined by the formula Ti(OR)$_4$ where each R is independently selected from the group consisting of alkyl, aryl, and cycloalkyl groups and acylates thereof.

3. The coating material of claim 1 wherein the organic titanate is a titanium chelate.

4. The coating material of claim 1 wherein the organic titanate is defined by the formula Ti(OR)$_4$ where R is an alkyl group.

5. The coating material of claim 1 wherein the alkyl group has less than seven carbon atoms.

6. The coating material of claim 1 wherein the organic finish is selected from the group consisting of urea alkyd bake, melamine alkyd bake, phenolic varnish, nitrocellulose alkyd.

7. The coating material of claim 1 additionally including an organic or inorganic acid to enhance color development.

8. The coating material of claim 1 in which the color concentrate comprises the reaction product of 1 weight percent to 90 weight percent of an organic titanate selected from the group consisting of tetraisopropyl titanate, tetrabutyl titanate, tetrakis (2-orthohexyl) titanate, tetrastearyl titanate, polytetrabutyl titanate, tetraoctylene glycol titanate, triethanolamine titanate, titanium acetyl acetonate, ammonium titanate lactate, titanium polyhydroxy-stearate, with a phenolic resin resulting from the condensation of an organic aldehyde with a compound selected from the group consisting of phenols, alkyl substituted phenols, and halogen substituted phenols.

9. A color concentrate for use as a dyestuff in ornamental resin coatings comprising the coating material of claim 8 in which the color concentrate comprises the reaction product of 1 weight percent to 90 weight percent of an organic titanate which includes the structure Ti(—O—)$_4$ with a phenolic resin resulting from the condensation of an organic aldehyde with a compound selected from the group consisting of phenols, alkyl substituted phenols, and halogen substituted phenols.

10. The color concentrate of claim 9 in which the compound is selected from the group consisting of phenol, o-cresol, m-cresol, p-cresol, isomeric xylenols, para-phenyl phenol, para-hydroxy biphenyl, para-chlorophenol, dichlorophenol, d-naphthol, b-naphthol, resorcinol, cashew nut liquid, Bisphenol A, p.t. butyl phenol, octyl phenol, nonyl phenol, and decyl phenol.

References Cited

UNITED STATES PATENTS

| 2,649,382 | 8/1953 | Vesce | 260—38X |
| 2,689,858 | 9/1954 | Boyd | 260—59X |
| 2,722,485 | 11/1955 | Jensen et al. | 260—38X |
| 2,727,918 | 12/1955 | Boyd | 260—59X |

OTHER REFERENCES

Feld et al.: The Organic Chemistry of Titanium, Butterworths, Inc., 1965, pp. 31, 40, 69–74.

MORRIS LIEBMAN, Primary Examiner

L. T. JACOBS, Assistant Examiner

U.S. Cl. X.R.

260—38, 39P